(12) United States Patent
Gu et al.

(10) Patent No.: US 11,463,542 B2
(45) Date of Patent: Oct. 4, 2022

(54) SERVER AND METHOD OF REPLACING A SERVER IN A NETWORK

(71) Applicant: Lenovo Enterprise Solutions (Singapore) Pte. Ltd., New Tech Park (SG)

(72) Inventors: Li Jun Gu, Shanghai (CN); Shao Hua Li, Shangai (CN); Xiao Le Shang, Shanghai (CN); Zhao Li Wang, Shanghai (CN)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 293 days.

(21) Appl. No.: 16/814,951

(22) Filed: Mar. 10, 2020

(65) Prior Publication Data

US 2020/0293336 A1    Sep. 17, 2020

(30) Foreign Application Priority Data

Mar. 11, 2019  (CN) .......................... 201910180725.6

(51) Int. Cl.
| | |
|---|---|
| *H04L 67/00* | (2022.01) |
| *G06F 1/18* | (2006.01) |
| *G06F 9/4401* | (2018.01) |
| *G06F 21/62* | (2013.01) |
| *H04L 41/0663* | (2022.01) |
| *G06F 8/60* | (2018.01) |

(52) U.S. Cl.
CPC .............. *H04L 67/34* (2013.01); *G06F 1/187* (2013.01); *G06F 9/4406* (2013.01); *G06F 9/4411* (2013.01); *G06F 21/6218* (2013.01); *H04L 41/0663* (2013.01); *G06F 8/60* (2013.01)

(58) Field of Classification Search
CPC ...... G06F 9/4411; G06F 1/187; G06F 9/4406; G06F 21/6218; G06F 8/60; G06F 21/575; H04L 41/0663; H04L 67/34; H04L 67/42
See application file for complete search history.

(56) References Cited

U.S. PATENT DOCUMENTS

| | | | |
|---|---|---|---|
| 6,543,004 B1 * | 4/2003 | Cagle ................... | G06F 11/1464 714/6.32 |
| 7,484,084 B1 * | 1/2009 | Ranaweera ............. | G06F 8/656 713/1 |
| 7,908,469 B2 * | 3/2011 | Yu .......................... | G06F 9/4401 713/1 |
| 9,710,284 B1 * | 7/2017 | Huang ................... | G06F 9/4403 |
| 10,313,301 B1 * | 6/2019 | Lin ....................... | H04L 61/2007 |

(Continued)

FOREIGN PATENT DOCUMENTS

TW         201734762 A   * 10/2017

*Primary Examiner* — Glenn A. Auve
(74) *Attorney, Agent, or Firm* — Olive Law Group, PLLC

(57) ABSTRACT

A method of replacing an original server in a network by a new server is disclosed. Each of the original server and the new server includes at least a baseboard management controller (BMC). The BMC can generate a set of data including at least one configuration data relating to a hardware of the original server. Further, the BMC of the original server can configure at least one hardware of the original server according to the set of data, the new server, and configure at least one hardware of the new server according to the set of data.

16 Claims, 4 Drawing Sheets

(56) References Cited

U.S. PATENT DOCUMENTS

| | | | |
|---|---|---|---|
| 2006/0036890 A1* | 2/2006 | Henrickson | G06F 11/1464 714/2 |
| 2009/0177999 A1* | 7/2009 | Martinez | G06F 8/61 715/810 |
| 2014/0122753 A1* | 5/2014 | Chiu | G06F 3/0604 710/74 |
| 2015/0381769 A1* | 12/2015 | Yeh | H04L 67/10 709/223 |
| 2016/0011879 A1* | 1/2016 | Wang | G06F 9/4401 713/1 |
| 2018/0060079 A1* | 3/2018 | Miller | G06F 8/65 |
| 2020/0249958 A1* | 8/2020 | Suryanarayana | G06F 3/0659 |

\* cited by examiner

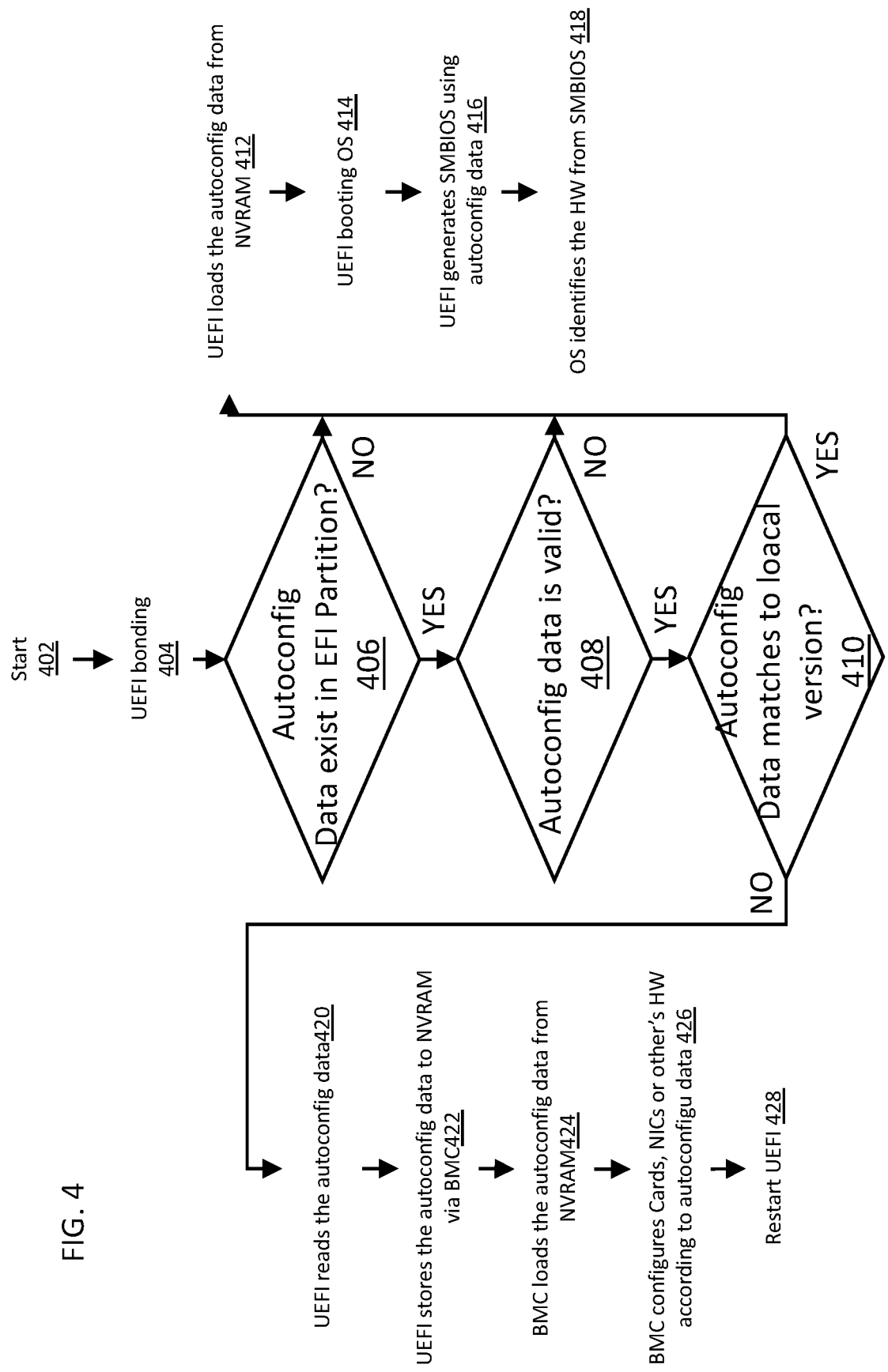

SERVER AND METHOD OF REPLACING A SERVER IN A NETWORK

CROSS REFERENCE TO RELATED APPLICATION

This application claim priority to Chinese Patent Application No. 201910180725.6, filed on Mar. 11, 2019, and titled SERVER AND METHOD OF REPLACING A SERVER IN A NETWORK; the content of which is hereby incorporated by reference herein in its entirety.

This invention relates to a method of replacing an existing server in a network, and a server adapted to replace such an existing server. Such a method and server may be used in, but not limited for, replacing an edge server in a network, such as an Internet of Things (IoT) system.

BACKGROUND OF THE INVENTION

In an IoT system, for the purpose of optimizing applications or cloud computing systems, some portions of an application, its data, or services may be taken away from one or more central nodes (the "core") to the other logical extreme (the "edge") of the Internet which makes contact with the physical world or end users. Servers at the edge, usually called "edge servers" or "edge nodes", usually work in rugged environment in various IoT applications.

When an edge server fails, a service engineer has to replace the broken edge server, and set up a new server as the edge node. During setup, and with reference to FIG. 1, the user has to:
(a) replace the broken server with a new one (102),
(b) install the operating software (OS) of the new edge node (104),
(c) configure node network connectivity to IoT system (106),
(d) register the new node into the IoT central cloud 108 (110),
(e) provision IoT application images, configurations and necessary data from central cloud (112), and
(f) launch IoT application (114).

Such a procedure for replacing a broken edge server suffers from the following shortcomings:
  The process for edge server replacement is identical to installing a whole new edge server, thus requiring long maintenance time.
  Server replacement involves service from different vendors: both IoT System administration (Cloud admin) and hardware field engineer are required.
  There is usually a lack of experienced information technology (IT) field engineer in IoT edge regions, and the normal procedures of node replacement are too complex.
  The network of which the edge node forms a part may not be reliable so that it is impossible to register the new node to Center cloud in such condition. The new node however will not work until the network is recovered.
  Even with the help of pre-load system or images in the new server, human configuration is required during node replacement.
  Previous IoT-created user data in the original node is hard to recover.

It is thus an object of the present invention to provide a method and a server in which the aforesaid shortcomings are mitigated or at least to provide a useful alternative to the trade and public.

SUMMARY OF THE INVENTION

According to a first aspect of the present invention, there is provided a method of replacing a first server in a network by a second server, Each of the first server and the second server include at least a baseboard management controller (BMC), including generating a set of data including at least one configuration data relating to at least one hardware of the first server. The BMC of the first server configures the at least one hardware of the first server according to the set of data, and boots the second server and configuring at least one hardware of the second server according to the set of data.

According to a second aspect of the present invention, there is provided a server including a baseboard management controller (BMC), and a first hard disk, The BMC is configured to generate a first set of data including at least one configuration data relating to at least one hardware of the server The BMC is configured to configure at least one hardware of the server according to the first set of data.

BRIEF DESCRIPTION OF THE DRAWINGS

Embodiments of the present invention will now be described, by way of example only, with reference to the accompanying drawings, in which:

FIG. 4 shows the steps taken on a new server to be used for replacing an existing server according to an embodiment of the present invention.

DETAILED DESCRIPTION OF THE EMBODIMENTS

Figure 1:
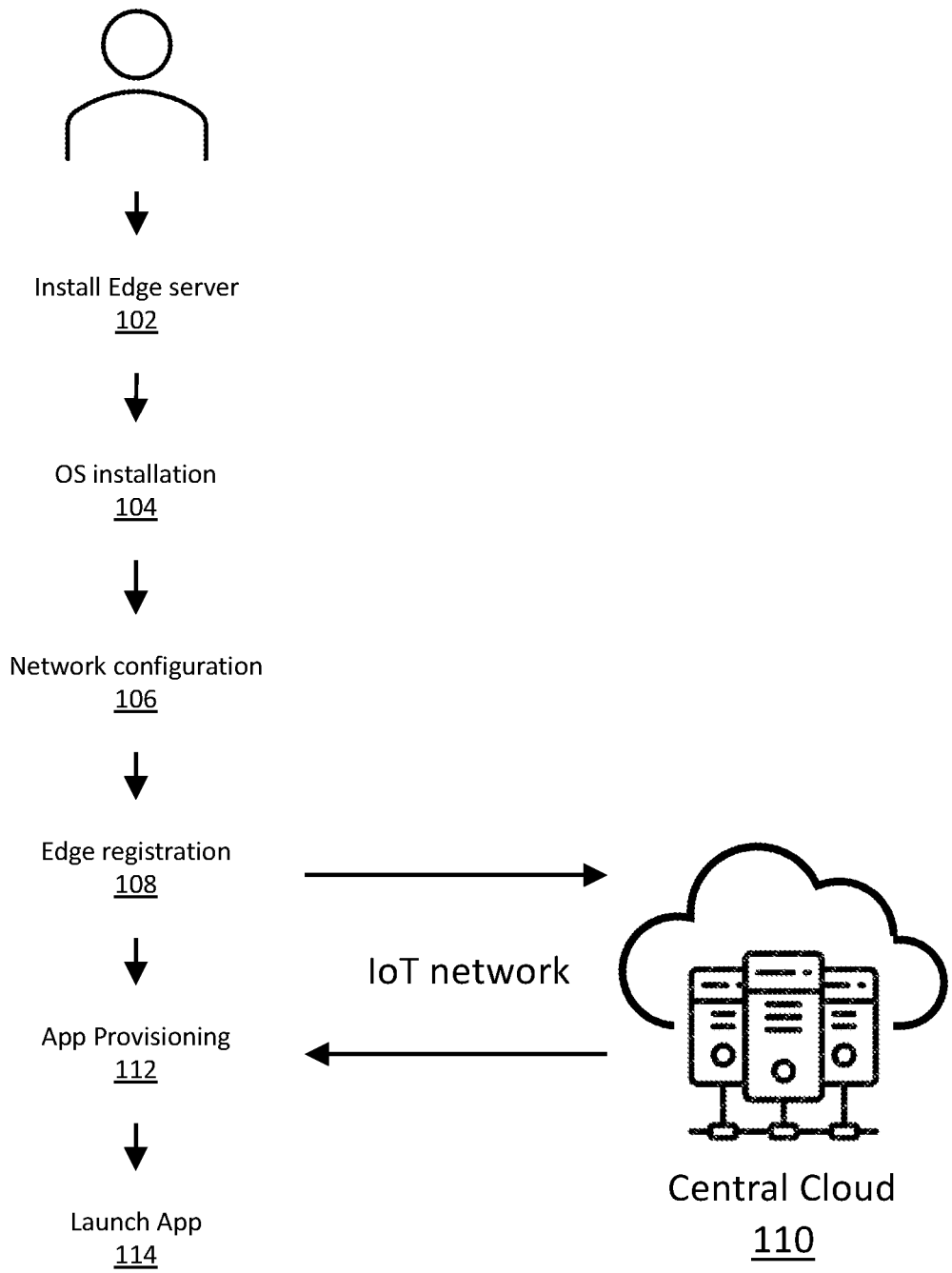
FIG. 1 shows the conventional steps of replacing a broken edge server and setting up a new server as the edge node in a network.
Figure 2:
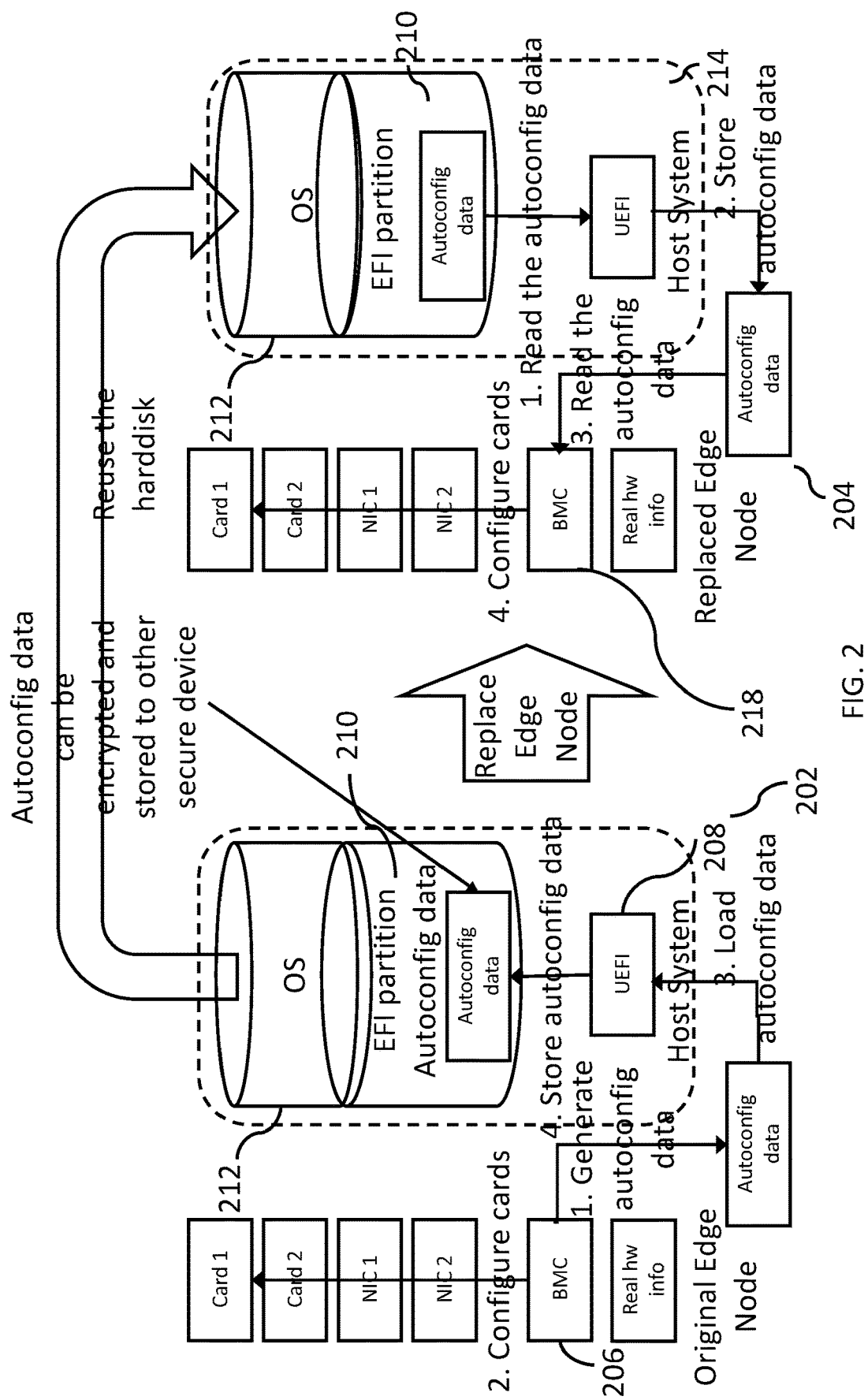
FIG. 2 shows the basic concept in a method of replacing an existing server in a network according to an embodiment of the present invention.

FIG. 2 shows, on the left side, an original edge node (server) 202 to be replaced (e.g. for having broken down), and on the right side, a new edge node (server) 204 for replacing the original edge node (server) 202.

When setting up the original server 202, its baseboard management controller (BMC) 206 generates autoconfig data, which is a data structure storing some critical hardware information and its configuration which are required by the operating system (OS)/Hypervisor. The hardware information may include the simulated board's information (such as its serial number), the respective card's serial number and on-card configuration data, the media access control (MAC) address for a network interface controller (NIC) card. The configuration information may include the unified extensible firmware interface (UEFI) settings, the licensed information, the BMC setting, and the redundant array of independent disks (RAID) configuration information. The BMC 206 uses the autoconfig data to configure various hardware (e.g. Card 1, Card 2, Card 3, Card 4) in the original server 202. A UEFI 208 of the original server 202 loads the "autoconfig" data from the BMC 206 and stores it to an EFI partition 210 of a storage device (e.g. hard disk) 212 of the original server 202. To enhance the security, the autoconfig data may be encrypted and stored in some other secure devices.

When setting up the new server 204 using the hard disk 212 of the original edge node 202, the hard disk 212 is removed from the original server 202 and connected to the new server 204. When the new server 204 boots up, the system 214 of the new server 204 uses autoconfig data stored in the EFI partition 210 of the hard disk 212 instead of the real hardware data for the new server 204 and OS running. The edge control center uses the autoconfig data to identify edge nodes instead of using the real hardware data. After replacement of the hard disk 212 in the new server 204, a UEFI 216 of the new server 204 loads the autoconfig data in the hard disk 212 and transfers such data to a BMC 218 of the new server 204. The BMC 218/UEFI 216 of the new server 204 uses the autoconfig data from the hard disk 212 of the original server 202 to configure and identify the hardware, e.g. Card 1, Card 2, Card 3, Card 4. When the new server 204 is booting to OS, the OS will believe it is running on the same hardware as before and no additional configuration is required.

Figure 3:
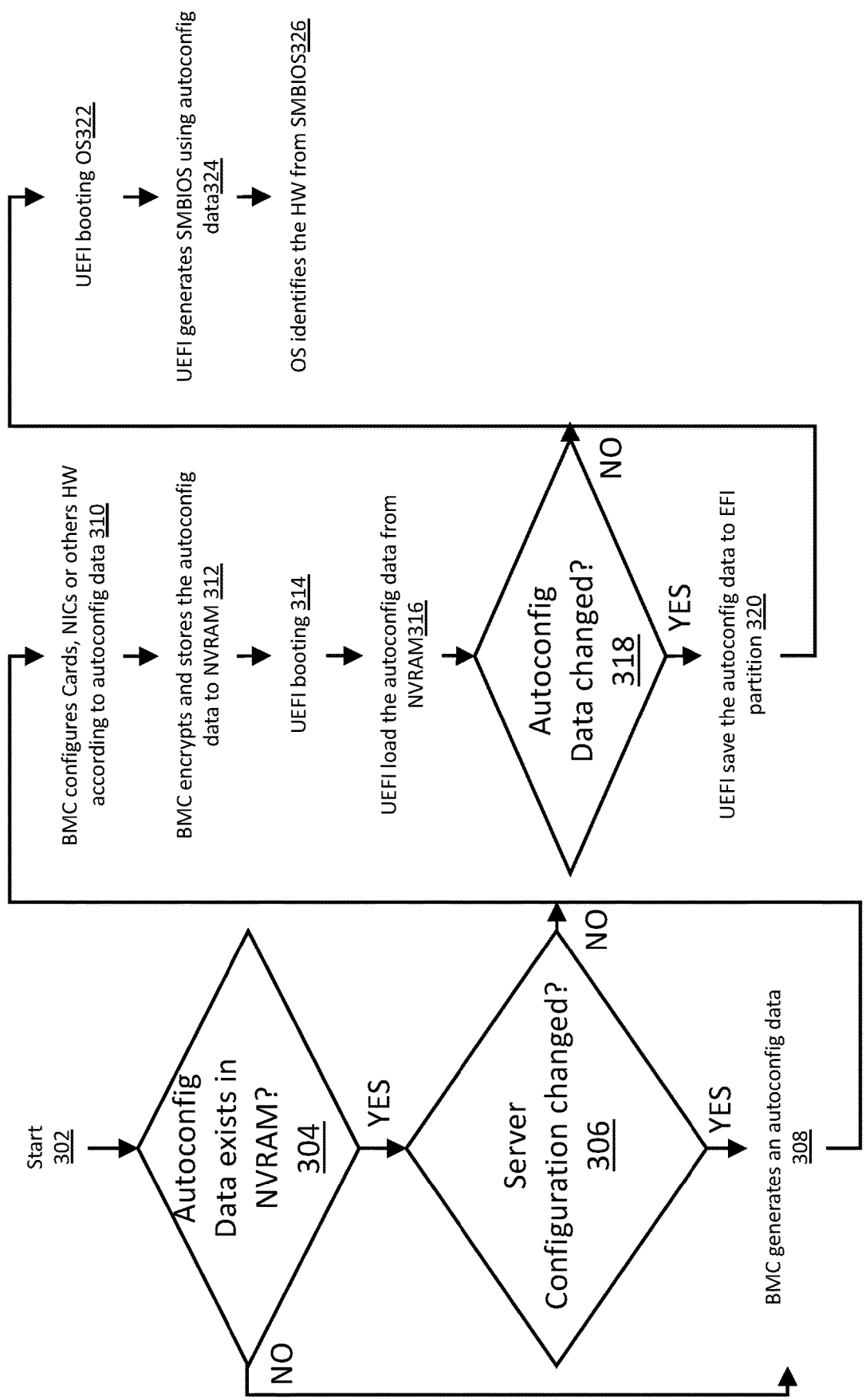
FIG. 3 shows the steps taken on an existing server to be replaced according to an embodiment of the present invention.

FIG. 3 shows the steps taken on the original server 202 to be replaced. When the process starts 302, the server 202 can check whether Autoconfig data exist in a non-volatile random access memory (NVRAM) 304. If yes, it can check whether the server configuration has been changed 306. If yes, the BMC 206 can generate a set of autoconfig data 308. If it is found that no autoconfig data exist in the NVRAM 304, the BMC 206 can also generate a set of autoconfig data 308. After the BMC 206 has generated a set of autoconfig data 308, the BMC 206 configures various hardware (e.g. cards, NICs, or other hardware) according to the autoconfig data 310. The BMC 206 then encrypts and stores the autoconfig data to the NVRAM 312. The UEFI 208 of the original server 202 can then carry out booting 314. If it is found that server configuration has not been changed 306, the UEFI 208 can also carry out booting 314. For booting 314, the UEFI 208 loads the autoconfig data from the NVRAM 316. If the autoconfig data has not been changed 318, the UEFI 208 can save the autoconfig data to the EFI partition 210 of the hard disk 212 320. The UEFI 208 then boots the OS 322. If it is found that the autoconfig data has been changed 318, the UEFI 208 also then boots the OS 322. The UEFI 208 generates system management BIOS (SMBIOS) using the autoconfig data 324, and the OS identifies the various hardware from the SMBIOS 326.

FIG. 4 shows the steps taken on the new server 204 to be used for replacing the original server 202. When the process starts 402, the UEFI 216 of the new server 204 carries out booting 404. If autoconfig data exist in the EFI partition 210 of the hard disk 212 406, and if the autoconfig data is valid 408, and if the autoconfig data matches the local version 410, the UEFI 216 of the new server 204 loads the autoconfig data from the NVRAM 412. If autoconfig data do not exist in the EFI partition of the hard disk 212 406, or if the autoconfig data is not valid 408, the UEFI 216 of the new server 204 also loads the autoconfig data from the NVRAM 412. The UEFI 216 then boots the OS 414. The UEFI 216 generates system management BIOS (SMBIOS) using the autoconfig data 416, and the OS identifies the various hardware from the SMBIOS 418. If the autoconfig data do not match the local version 410, the UEFI 216 reads the autoconfig data 420, then stores the autoconfig data to the NVRAM via the BMC 218 422. The BMC 218 then loads the autoconfig data from the NVRAM 424. The BMC 218 then configures the various hardware (including various cards NICs, etc.) according to the autoconfig data. Then the UEFI 216 restarts 428. The UEFI 216 of the new server 204 then carries out booting again 404.

It should be understood that the above only illustrates examples whereby the present invention may be carried out, and that various modifications and/or alterations may be made thereto without departing from the spirit of the invention.

It should also be understood that certain features of the invention, which are, for clarity, described in the context of separate embodiments, may be provided in combination in a single embodiment. Conversely, various features of the invention which are, for brevity, described in the context of a single embodiment, may also be provided separately or in any appropriate sub-combinations.

The invention claimed is:

1. A method of replacing a first server in a network by a second server, each of the first server and the second server including at least a baseboard management controller (BMC), the method comprising:
   generating a set of data including at least one configuration data relating to at least one hardware of the first server;
   encrypting the set of data;
   the BMC of the first server configuring the at least one hardware of the first server according to the set of data; and
   booting the second server and configuring at least one hardware of the second server according to the set of data.

2. The method of claim 1, wherein the BMC of the first server generates the set of data.

3. The method of claim 1, further comprising storing the set of data in a hard disk of the first server.

4. The method of claim 3, further comprising removing a hard disk from the first server and connecting the hard disk with the second server.

5. The method of claim 3, wherein the set of data is stored in an extensible firmware interface (EFI) system partition of the hard disk.

6. The method of claim 1, wherein the BMC of the second server configures the at least one hardware of the second server according to the set of data.

7. The method of claim 1, further comprising a unified extensible firmware interface (UEFI) of the second server generating SMBIOS by using the set of data.

8. The method of claim 7, further comprising an operating system (OS) of the second server identifying the at least one hardware of the second server from the SMBIOS.

9. A server comprising:
   a baseboard management controller (BMC); and
   a first hard disk,
   wherein the BMC is configured to generate a first set of data including at least one configuration data relating to at least one hardware of the server,
   wherein the first set of data is encrypted,
   wherein the BMC is configured to configure at least one hardware of the server according to the first set of data.

10. The server of claim 9, wherein the BMC is configured to generate the first set of data.

11. The server of claim 9, wherein the first set of data is stored in the first hard disk.

12. The server of claim 11, wherein the first set of data is stored in an extensible firmware interface (EFI) system partition of the first hard disk.

13. A server comprising:
   a baseboard management controller (BMC); and
   a first hard disk, wherein the BMC is configured to generate a first set of data including at least one configuration data relating to at least one hardware of the server, wherein the BMC is configured to configure at least one hardware of the server according to the first set of data, and wherein the first hard disk is replaceable by a second hard disk with a second set of data, and the server is configured to be booted and at least one hardware of the server is configured according to the second set of data.

14. The server of claim 13, wherein the BMC is configured to configure the at least one hardware of the server according to the second set of data.

15. The server of claim 13, wherein a unified extensible firmware interface (UEFI) is configured to generate SMBIOS by using the second set of data.

16. The server of claim 15, wherein an operating system (OS) of the server is configured to identify the at least one hardware of the server from the SMBIOS.

* * * * *